(12) United States Patent
Maehara

(10) Patent No.: US 7,235,952 B2
(45) Date of Patent: Jun. 26, 2007

(54) CONTROL APPARATUS FOR ELECTRICAL GENERATOR APPARATUS OF MOTOR VEHICLE

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 332 days.

(21) Appl. No.: 11/006,645

(22) Filed: Dec. 8, 2004

(65) Prior Publication Data

US 2005/0135133 A1 Jun. 23, 2005

(30) Foreign Application Priority Data

Dec. 8, 2003 (JP) .............................. 2003-409181

(51) Int. Cl.
*H02H 7/06* (2006.01)
*H02M 1/00* (2006.01)
*G05F 1/10* (2006.01)

(52) U.S. Cl. ........................................ 322/24; 363/145

(58) Field of Classification Search .................... 363/3, 363/8–10, 52, 53, 84, 89, 144, 145, 152; 322/22–25, 27–29, 47, 89
See application file for complete search history.

(56) References Cited

U.S. PATENT DOCUMENTS

| | | | |
|---|---|---|---|
| 5,629,606 A | 5/1997 | Asada | |
| 5,757,164 A * | 5/1998 | Yoshizaki et al. | ............. 322/8 |
| 6,137,247 A | 10/2000 | Maehara et al. | |
| 6,700,354 B2 * | 3/2004 | Okuno et al. | ................. 322/29 |
| 6,777,905 B2 * | 8/2004 | Maehara | ..................... 318/650 |
| 7,009,366 B2 * | 3/2006 | Maehara | ....................... 322/28 |
| 7,075,272 B2 * | 7/2006 | Sasaki et al. | ................... 322/28 |
| 7,098,628 B2 * | 8/2006 | Maehara et al. | ............... 322/24 |
| 7,106,029 B2 * | 9/2006 | Inokuchi et al. | .............. 322/28 |
| 2006/0186863 A1 * | 8/2006 | Yamamoto et al. | .......... 322/28 |
| 2006/0197346 A1 * | 9/2006 | Maehara | ................... 290/40 B |
| 2006/0238172 A1 * | 10/2006 | Maehara et al. | .............. 322/33 |

FOREIGN PATENT DOCUMENTS

| | | |
|---|---|---|
| EP | 0 720 271 A1 | 7/1996 |
| EP | 0 725 473 A2 | 8/1996 |
| JP | A-08-238000 | 9/1996 |
| JP | A-11-146698 | 5/1999 |
| JP | A-11-262299 | 9/1999 |
| JP | A-2002-325085 | 11/2002 |

* cited by examiner

*Primary Examiner*—Matthew V. Nguyen
(74) *Attorney, Agent, or Firm*—Oliff & Berridge PLC

(57) ABSTRACT

A generator control apparatus, for controlling electrical generation operation of a vehicle alternator, has a LAN circuit and a dedicated communication circuit, respectively communicating with an external control apparatus (e.g., engine ECU) via a LAN and via a dedicated signal line. When a selection signal is transmitted from the external control apparatus, designating a specific signal to be transmitted to or from the generator control apparatus, communication of that signal is performed via the dedicated signal line, enabling TDM communication of plural signals via the LAN concurrent with direct communication of a specific signal via the dedicated signal line.

16 Claims, 5 Drawing Sheets

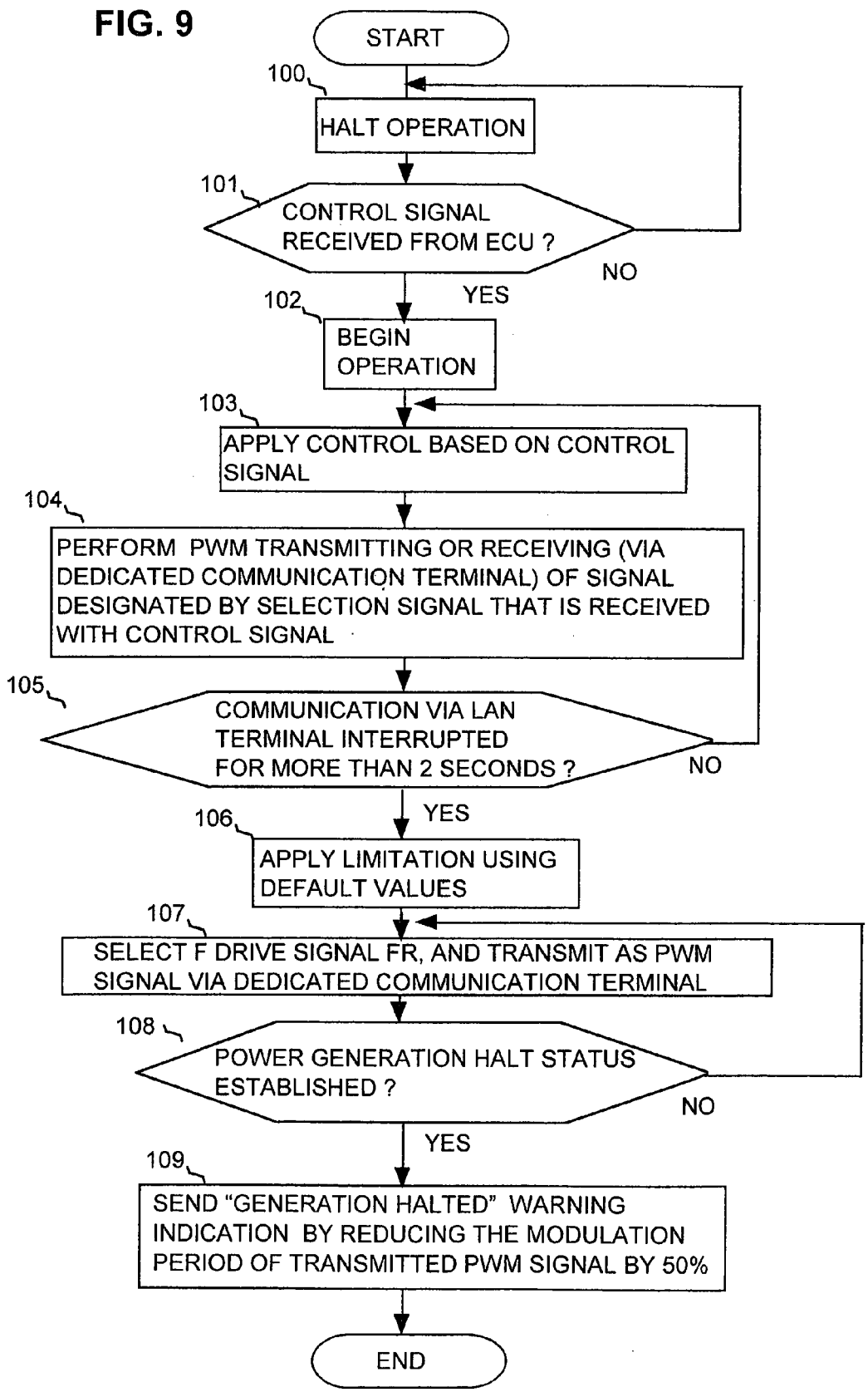

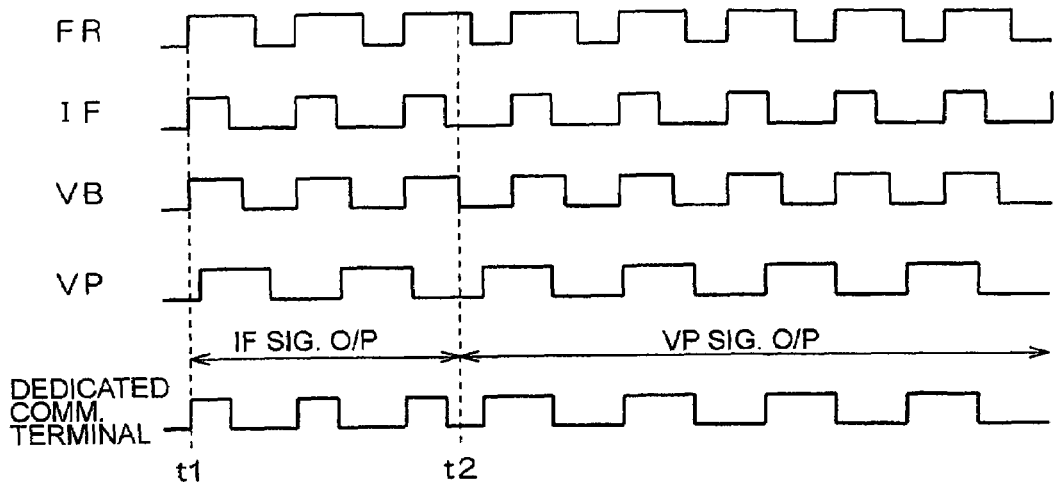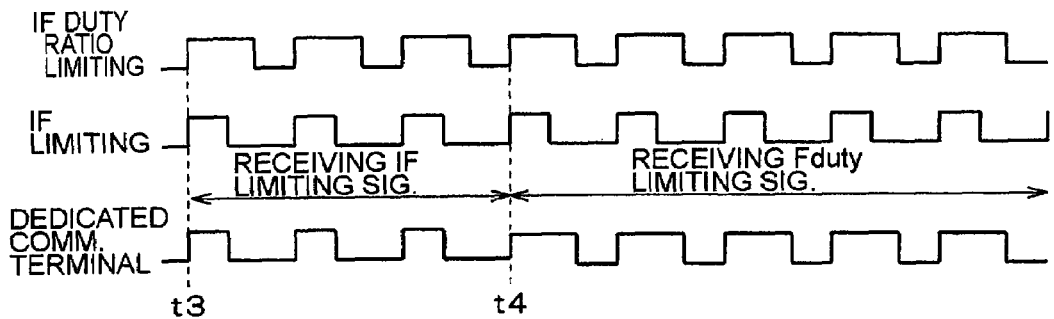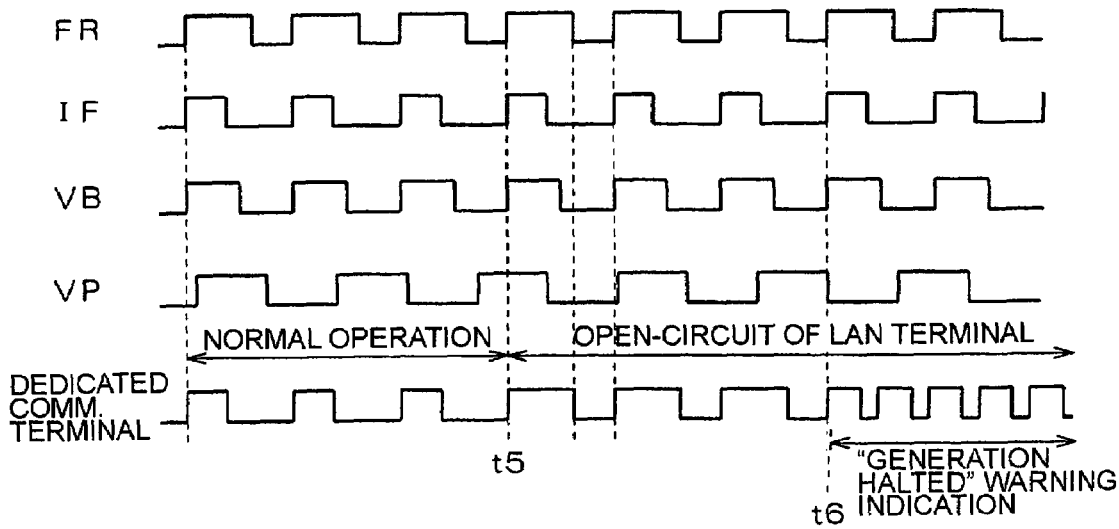

CONTROL APPARATUS FOR ELECTRICAL GENERATOR APPARATUS OF MOTOR VEHICLE

CROSS-REFERENCE TO RELATED APPLICATIONS

This application is based on and incorporates herein by reference Japanese Patent Application No. 2003-409181 filed on Dec. 8, 2003.

FIELD OF APPLICATION

The present invention relates to a control apparatus for an electrical generator apparatus that is mounted in a vehicle and is driven by the vehicle engine to generate electric power.

PRIOR ART TECHNOLOGY

In recent years, as environmental regulations become increasingly stringent, measures to reduce the fuel consumption of motor vehicle have been adopted such as reducing the idling speed of the vehicle engine, lowering of levels of friction, etc. However there has been an increased degree to which various equipment of a motor vehicle are driven by electric power, and for incorporating additional electrical equipment for use in servicing the vehicle, so that the total amount of electrical load that must be supplied has tended to increase. Hence, an increased level of output power must be supplied by the vehicle-mounted electrical generator apparatus having an alternator that is driven by the vehicle engine to produce an AC voltage that is rectified to obtain a supply voltage for operating various electrical equipment of the vehicle, as well as for charging the vehicle battery. Variations in the level of power that must be supplied by the electrical generator apparatus result in corresponding variations in the level of torque that are required from the engine, to drive the electrical generator apparatus. Such changes in torque can result in significant variations in engine speed, when the engine is operating in a low-speed idling condition. For that reason, a requirement has arisen for some unified form of control of the engine and electrical generator apparatus operation, based on interchange of electrical signals between a generator control apparatus that controls the operation of the vehicle generator apparatus and the engine ECU (Electronic Control Unit), whereby appropriate control can be applied to the engine idling speed in accordance with varying levels of torque required by the electrical generator apparatus for supplying variations in electrical load.

In the prior art, it has been envisaged that such interchange of signals between the generator control apparatus and the engine ECU would take place via a vehicle-mounted LAN (Local Area Network), as described for example in Japanese Patent Laid-Open No. 2002-325085 (pages 4 to 8, FIGS. 1 to 7), referred to in the following as reference document 1. Such LANs are now generally utilized in motor vehicles.

Other methods of interchanging such signals have been proposed, which utilize communication via dedicated terminals and signal lines instead of a vehicle LAN, for example as described in Japanese Patent Laid-Open No. 11-146698 (pages 4 to 6, FIGS. 1 to 8), referred to in the following as reference document 2, Japanese Patent Laid-Open No. 11-262299 (pages 4 to 9, FIGS. 1 to 13), referred to in the following as reference document 3, and in Japanese Patent Laid-Open No. 8-238000 (pages 5 to 11, FIGS. 1 to 10), referred to in the following as reference document 4.

With the method described in reference document 1, using a vehicle LAN for interchange of signals, the signals are transmitted and received as digital signals by serial data communication, using time-division multiplexing. Hence, as the number of electrical devices that are connected to the vehicle LAN is increased, the greater becomes the time separation between successive time slots that are allocated to any specific device, in the serial data communication stream. Thus, the speed of response of each device is lowered, so that such a method is not suitable in the case of signals for which a high speed of response is necessary, or which must be read out substantially continuously, with only very short intervals between successive signal portions being allowable.

Moreover, due to the fact that a vehicle electrical generator apparatus is installed within the engine compartment of a motor vehicle, the operating environment is extremely severe, with various power supply leads being disposed close to the signal lines. Hence, electrical noise is induced in the signal lines, due to loads that are driven by the power supply, or due to noise radiated from other signal lines, so that noise becomes superimposed upon transmitted signals, resulting in digital data signals being received that contain errors. Hence, reliable communication may not be ensured. For that reason, greater reliability of communication can be achieved by using dedicated signal lines for respective signals, rather than multiplexed digital signals.

This problem of lowering of reliability of data communication is especially severe in the case of warning signals which indicate abnormal operation of the vehicle electrical generator apparatus, in particular when such warning signals are produced while the vehicle is running.

To increase the reliability of such communication against the effects of noise, it is possible to employ improved communication protocols, or improved hardware. However, such measures result in increased manufacturing costs, and hence should be avoided if possible, so long as the only actual problem is that of reliability of communication with the generator control apparatus.

With the methods respectively described in reference documents 2 to 4, whereby signals are transmitted and received using respective dedicated communication terminals, it is necessary to handle a number of different types of signals, having various levels of voltage and having changing values of duty ratio. Hence, the greater the number of signals that must be handled, the more difficult it becomes to apply such a method. It is possible to increase the number of different types of signals that can be handled, by increasing the number of dedicated communication terminals. However this results in a substantial increase in manufacturing costs, and the possibility of failure due to a short-circuit or open-circuit failure of a communication line is correspondingly increased, so that such methods have disadvantages.

SUMMARY OF THE INVENTION

It is an objective of the present invention to overcome the problems of the prior art set out above, by providing a vehicle-mounted generator control apparatus (referred to in the following simply as a vehicle generator control apparatus which can transmit and receive various different types of signal to/from an external control apparatus, and provides communication with excellent speed of response and high resistance to the effects of electrical noise, while avoiding the necessity to provide a number of dedicated communication terminals and corresponding dedicated communication lines.

To achieve the above objectives, the invention provides a vehicle generator control apparatus which can communicate with an external control apparatus to exchange signals including control signals (i.e., transmitted from the external control apparatus) for controlling the operating condition of the vehicle alternator by on/off switching of the flow of field current (i.e., excitation current) in the field coil (i.e., stator winding) of the alternator, and signals relating to the operation condition of the alternator (transmitted from the generator control apparatus). The invention is for use in a vehicle that is equipped with a LAN (local area network), and the generator control apparatus includes a LAN (local area network) terminal that is connected via the vehicle LAN to the external control apparatus, and a LAN circuit coupled to the LAN terminal, for transmitting/receiving signals via the LAN terminal. The generator control also includes a dedicated communication terminal that is connected via a dedicated signal line to the external control apparatus, and a dedicated communication circuit that is coupled to the dedicated communication terminal, for transmitting and receiving signals via the dedicated communication terminal.

As a result, a number of different signals can be transmitted or received substantially concurrently via the LAN terminal, sent in digital signal form by time-division multiplexing of the signals, while in addition any specific signals can be either transmitted or received (at any one time) via the dedicated communication terminal. Communication via the dedicated communication terminal has the advantage that there is no delay in communication caused by the effects of multiplexing and transfer of digital signals through a network, as occurs with use of the LAN terminal.

The external control apparatus can designate that a specific signal is to be transmitted to it from the external control apparatus via the dedicated communication terminal or is to be received by the external control apparatus via the dedicated communication terminal, by transmitting to the generator control apparatus (via the LAN terminal) a selection signal which designates the specific signal, i.e., as a maximum priority signal.

In that way, the advantages of providing a dedicated communication terminal are obtained while avoiding the disadvantage of increased manufacturing cost that would result from providing a number of dedicated communication terminals (to enable concurrent communication of a plurality of signals) as in the prior art.

The generator control apparatus includes means for producing a field coil drive signal, for on/off switching control of the level of field current. According to another aspect of the invention the dedicated communication circuit can include means which operate, when the field coil drive signal is designated by the selection signal, to produce a PWM (pulse width modulation) signal expressing the waveform of the field coil drive signal, and transmit the PWM signal via the dedicated communication terminal to the external control apparatus. The external control apparatus can thereby at any time (i.e., as a part of normal operation, or when specially required) acquire a signal representing the field coil drive signal, transmitted via the dedicated communication terminal. The external control apparatus can thereby monitor the operating condition of the electrical generator apparatus by real-time operation, and can accurately control the idling speed of the vehicle engine accordingly, i.e., by controlling the engine operation in accordance with the level of torque that is currently required to drive the alternator of the electrical generator apparatus.

From another aspect of the invention, the generator control apparatus can include means to produce a rotation signal representing the (AC) phase voltage that is generated by one of the phase windings of the alternator, and the dedicated communication circuit can include means that operate when the rotation signal is designated by the selection signal from the external control apparatus, to produce a PWM signal expressing the waveform of the rotation signal and transmit the PWM signal via the dedicated communication terminal to the external control apparatus. The generator control apparatus can thereby at any time (as a part of normal operation, or when specially required) obtain the value of the speed of rotation of the rotor of the alternator of the electrical generator apparatus (i.e., as represented by the alternation period of the phase voltage of the alternator), with that signal being acquired accurately and without delay.

The external control apparatus can thereby compare the actual speed of rotation of the rotor of the alternator with the vehicle engine speed of rotation, and so can, for example, detect slippage of the drive belt of the alternator, or obtain the actual pulley ratio by which the alternator is being driven from the engine.

The electrical generator apparatus of a vehicle rectifies the AC voltage generated by the alternator to derive an output voltage, and according to another aspect of the invention, the generator control apparatus can include means to produce an output voltage signal expressing the value of the output voltage of the electrical generator apparatus, and the dedicated communication circuit can include means which operate, when the output voltage signal is designated by the selection signal from the external control apparatus, to produce a PWM signal expressing the waveform of the output voltage signal from the electrical generator apparatus, and transmit that PWM signal via the dedicated communication terminal to the external control apparatus. The external control apparatus can thereby at any time (as a part of normal operation, or when specially required) request and obtain a signal expressing the output voltage that is being produced at that point in time by the electrical generator apparatus, with that signal being transferred directly via the dedicated communication terminal.

The external control apparatus can thereby perform processing of that signal to smooth out the ripple that will be present in the output voltage from the electrical generator apparatus, to thereby obtain the average value of output voltage, and so can accurately detect any abnormality of the output voltage from the electrical generator apparatus.

From another aspect, the generator control apparatus can include means for producing a field current signal that expresses the level of a field current of the field coil, with the dedicated communication circuit including means that operate, when the field current signal is designated by the selection signal from the external control apparatus, to produce a PWM signal expressing the waveform of the field current signal and transmit the PWM signal via the dedicated communication terminal to the external control apparatus. The external control apparatus can thereby at any time (as a part of normal operation, or when specially required) obtain the value of field current of the alternator field coil at that point in time.

As a result, even if fluctuations in the level of the field current are occurring due to instability of controlling the output voltage of the electrical generator apparatus or of controlling the field current, the external control apparatus can perform processing to accurately obtain the average value of the field current. The external control apparatus can thereby utilize that average value of field current to accurately determine the level of torque required to drive the alternator at that time, and can control the operation of the vehicle engine (e.g., to maintain a stable idling speed) accordingly.

The external control apparatus may produce a duty ratio limiting signal, expressing an upper limit value of the duty ratio of the repetitive on/off switching control of the field current of the alternator and may also produce a field current limiting signal, expressing an upper limit value of the field current of the alternator. From another aspect of the invention, the dedicated communication circuit can include means that operate when the duty ratio limiting signal is designated by the aforementioned selection signal from the external control apparatus, to receive the duty ratio limiting signal transmitted via the dedicated communication terminal in PWM signal form, or, when the field current limiting signal is designated by the selection signal, to receive that field current limiting signal as a PWM signal. The dedicated communication circuit can further include means for converting the received PWM duty ratio limiting signal or field current limiting signal into suitable form for being supplied to respective appropriate circuits within the generator control apparatus.

In that way, the external control apparatus can flexibly control the operation of the electrical generator apparatus, with a high speed of control response.

The external control apparatus may be configured to produce a voltage regulation signal, which specifies a value to which the output voltage of the electrical generator apparatus is to be regulated. From another aspect of the invention, the dedicated communication circuit can include means for receiving the voltage regulation signal in the form of a PWM signal and converting that PWM signal into suitable form for being supplied to an appropriate internal circuit of the generator control apparatus, when the voltage regulation signal is designated by the aforementioned selection signal, transmitted via the LAN terminal.

The external control apparatus can thereby further control the generating condition of the electrical generator apparatus, with excellent control response characteristics.

From another aspect, one of the aforementioned plurality of specific signals can be predetermined as being a maximum priority signal, and the dedicated communication circuit can include means that operate when communication via the LAN terminal is interrupted, to produce a PWM signal expressing the waveform of the maximum priority signal and transmit the PWM signal via the dedicated communication terminal to the external control apparatus. In that way the external control apparatus can continue to perform at least the most essential control of the electrical generator apparatus, even if communication via the LAN terminal is interrupted.

In general, the field coil drive signal would typically be predetermined as being the maximum priority signal.

From another aspect, the dedicated communication circuit can include means which operate when an abnormal generation status of the electrical generator apparatus occurs, to transmit a warning signal via the dedicated communication terminal to the external control apparatus.

Typically, the abnormal generation status would consist of a cessation of power generation by the electrical generator apparatus.

The warning signal can be advantageously implemented as a PWM signal having a modulation period that is different from a common modulation period of all other PWM signals that are transmitted via the dedicated communication terminal.

From another aspect, the dedicated communication circuit can include means which operate, when communication via the LAN terminal is interrupted, to transmit a signal indicating the electrical generation condition of the electrical generator apparatus, via the dedicated communication terminal to the external control apparatus.

From another aspect, the dedicated communication circuit can include means for producing a first PWM signal that expresses the waveform of the field coil drive signal, when communication via the LAN terminal is interrupted while the electrical generator apparatus is functioning normally, and for transmitting the first PWM signal via the dedicated communication terminal to the external control apparatus. Such means can further be arranged to produce a second PWM signal that has a different modulation period from the first PWM signal, when the electrical generator apparatus enters an abnormal electrical generation status while communication via the LAN terminal is interrupted, with the second PWM signals being transmitted via the dedicated communication terminal to the external control apparatus.

Communication between the LAN circuit and the external control apparatus can for example be performed on a master/slave basis, with the external control apparatus functioning as a master apparatus and the LAN circuit functioning as a slave apparatus.

BRIEF DESCRIPTION OF THE DRAWINGS

FIG. 9 is a flow diagram of control operations performed by the above embodiment;

FIG. 10 is a waveform diagram of signals that are transmitted from the generator control apparatus via a dedicated communication terminal, with the above embodiment, during normal operation of the vehicle generator apparatus;

FIG. 11 is a waveform diagram of signals that are received by the generator control apparatus via the dedicated communication terminal, with the above embodiment; and FIG. 12 is a waveform diagram of signals that are transmitted from the generator control apparatus via the dedicated communication terminal in the event of occurrence of an abnormal electric power generating condition at a time when communication via the LAN terminal is interrupted.

DESCRIPTION OF PREFERRED EMBODIMENTS

Figure 1:
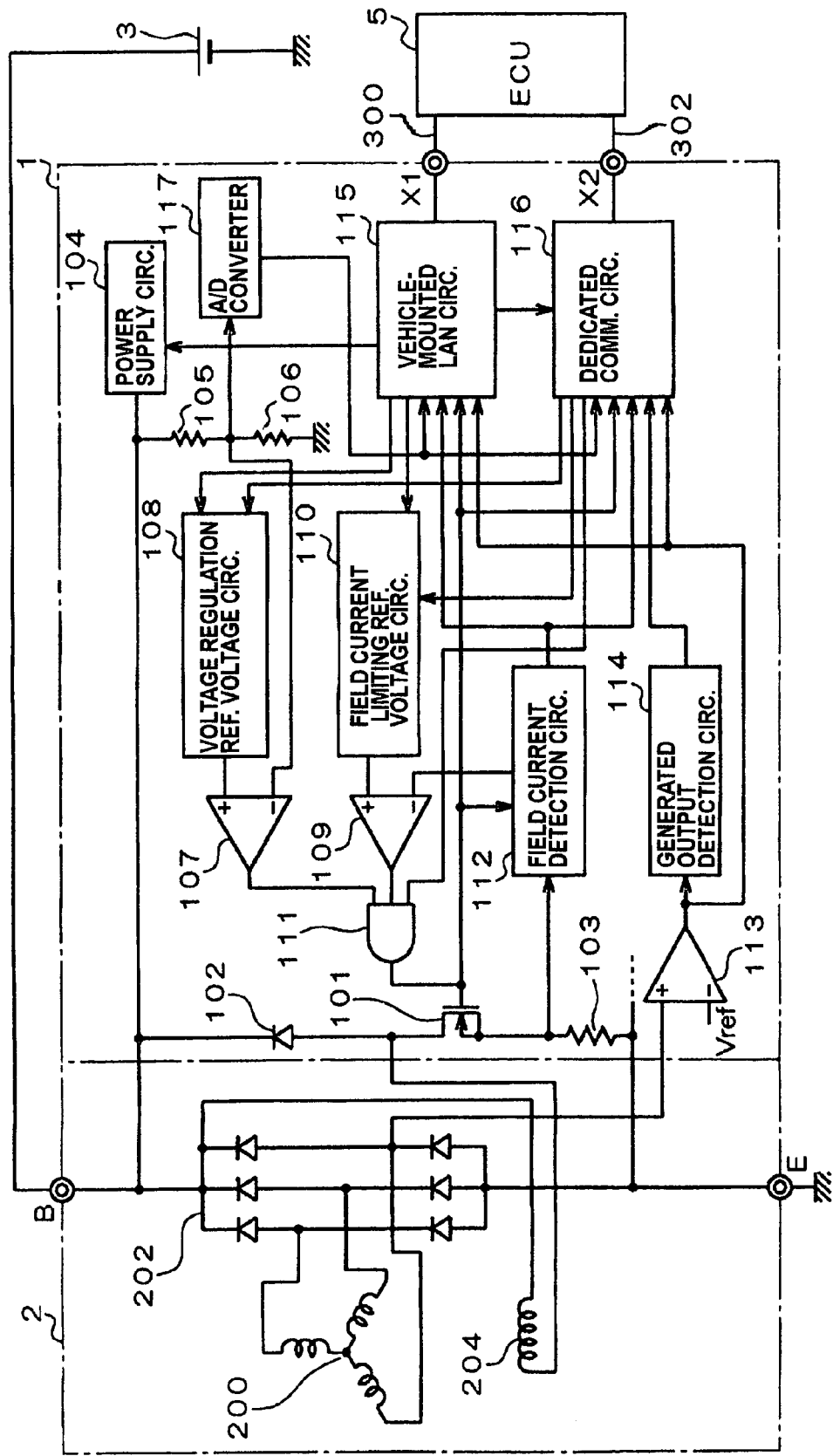
FIG. 1 shows the overall configuration of an embodiment of a generator control apparatus, connected to a vehicle generator apparatus and engine ECU.

FIG. 1 shows the configuration of an embodiment of an generator control apparatus 1, illustrating how the generator control apparatus is connected to an electrical generator apparatus 2, a battery and an engine ECU of a vehicle. The vehicle generator control apparatus 1 performs control whereby the voltage appearing at an output terminal (B terminal) of a vehicle generator apparatus 2 remains at a predetermined regulated value, such as 14 V.

The vehicle generator apparatus 2 includes an alternator having a 3-phase stator coil 200 and a field coil 204 (formed on the rotor of the alternator), and a rectifier circuit 202 for performing full-wave rectification of the 3-phase output voltages produced from the stator coil 200, to obtain the DC output voltage that is supplied to the B terminal of the vehicle generator apparatus 2. The vehicle generator control apparatus 1 controls the output voltage of the vehicle generator apparatus 2 by adjusting the level of field current that flows in the 204, by successive on/off switching operation. The output from the B terminal of the vehicle generator apparatus 2 is supplied as a charging current to the vehicle battery 3, and to operate various electrical equipment of the vehicle.

The vehicle generator control apparatus 1 is also connected for communication with an external apparatus, which in this embodiment is an engine ECU 5, via a LAN terminal X1 and a dedicated communication terminal X2 respectively. The LAN terminal X1 is connected to the engine ECU 5 by a data communication path through a vehicle LAN 300 (represented only as a communication line, to simplify the drawing) while the dedicated communication terminal X2 is connected to the engine ECU 5 through a dedicated signal line 302.

As shown in FIG. 1, the vehicle generator control apparatus 1 is formed of a MOS-FET (metal-oxide semiconductor field effect transistor) 101, a reverse current diode 102, a sensing resistor 103, a power supply circuit 104, resistors 103, 105, 106, voltage comparators 107, 109, 113, a voltage regulation reference voltage circuit 108, a field current limiting reference voltage circuit 110, an AND circuit 111, a field current detection circuit 112, a generated output detection circuit 114, a vehicle-mounted LAN circuit 115, a dedicated communication circuit 116, and an A/D (analog to digital) converter 117.

The source and drain electrodes of the MOS-FET 101 are connected in series with the field coil 204, and a drive signal FR is applied to the gate electrode of the MOS-FET 101, as a field coil drive signal. The MOS-FET 101 thereby functions as a switching element that controls on/off switching of the field current that flows in the field coil 204 in accordance with the drive signal FR. The reverse current diode 102 is connected in parallel with the field coil 204, and conducts a flow of reverse current from the field coil 204 when the MOS-FET 101 is set in the cut-off state. The sensing resistor 103 is connected between the source electrode of the MOS-FET 101 and ground potential (i.e., the E terminal), and is used to obtain a voltage indicative of the level of field current that flows through the field coil 204 and between the drain and source electrodes of the MOS-FET 101.

The power supply circuit 104 produces various supply voltages for respective circuits of the vehicle generator control apparatus 1. The resistors 105, 106 constitute a voltage divider circuit for detecting the level of output voltage from the vehicle generator apparatus 2. The voltage comparator 107 is used in regulating the output voltage from the vehicle generator apparatus 2, by comparing the detection voltage produced by the voltage divider circuit formed by resistors 105, 106 with an output voltage regulation reference voltage that is produced from the voltage regulation reference voltage circuit 108, to produce an output regulation control signal. Specifically, the detection voltage from the voltage divider circuit and the output voltage regulation reference voltage are applied to the negative input terminal and positive input terminal respectively of the voltage comparator 107, so that when the detection voltage from the voltage divider circuit becomes lower than the output voltage regulation reference voltage, the output regulation control signal goes to a high level (i.e., a voltage representing a "H" logic level). Conversely when the detection voltage from the voltage divider circuit becomes higher than the output voltage regulation reference voltage, the output regulation control signal goes to a low level (i.e., a voltage representing a "L" logic level).

The voltage regulation reference voltage circuit 108 sets the level of the output regulation control signal based on a voltage regulation signal that is supplied from the exterior via the vehicle-mounted LAN circuit 115 or via the dedicated communication circuit 116, transmitted from the engine ECU 5.

Figure 2:
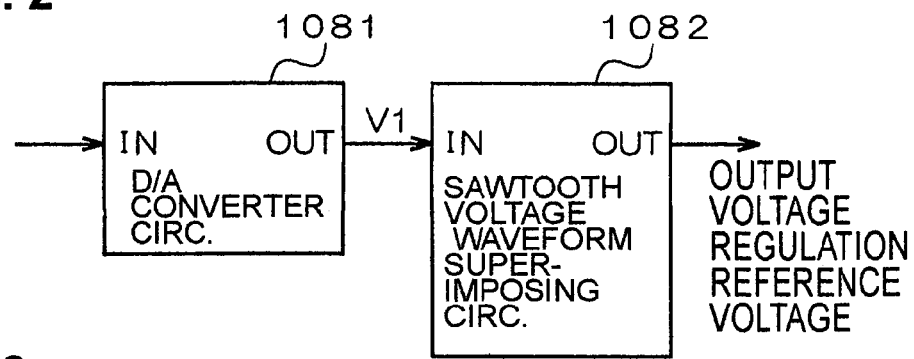
FIG. 2 shows details of a voltage regulation reference voltage circuit of the generator control apparatus of the above embodiment.
Figure 3:
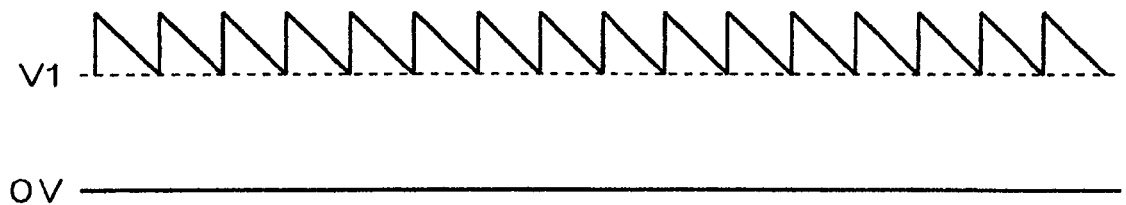
FIG. 3 is a waveform diagram for describing the operation of the voltage regulation reference voltage circuit.

FIG. 2 shows details of the configuration of the voltage regulation reference voltage circuit 108, while FIG. 3 is a waveform diagram of the output voltage regulation reference voltage that is produced by the voltage regulation reference voltage circuit 108. As shown, the voltage regulation reference voltage circuit 108 is formed of a D/A converter 1081 and a sawtooth waveform voltage superimposing circuit 1082. The D/A converter 1081 converts the voltage regulation signal (i.e., a digital signal) supplied to the input terminal IN from the vehicle-mounted LAN circuit 115, to a corresponding analog voltage signal V1 appearing at an output terminal OUT. This is supplied to the sawtooth waveform voltage superimposing circuit 1082, which generates the output voltage regulation reference voltage by superimposing a sawtooth waveform voltage on the voltage signal V1.

The voltage comparator 109 serves to control the field current of the field coil 204, by comparing the level of a current detection voltage (produced from the field current detection circuit 112) with a field current limiting reference voltage (produced from the field current limiting reference voltage circuit 110) to thereby produce a field current limiting control signal. Specifically, the field current detection voltage is applied to the negative input terminal of the voltage comparator 109 while the field current limiting reference voltage is applied to the positive input terminal, so that when the detection voltage from the field current detection circuit 112 is lower than the field current limiting reference voltage, the voltage comparator 109 produces the field current limiting control signal at the aforementioned high level, and when the detection voltage from the field current detection circuit 112 is higher than the field current limiting reference voltage, the voltage comparator 109 produces the field current limiting control signal at the aforementioned low level.

The field current limiting reference voltage circuit 110 sets the value of the field current limiting reference voltage, which limits the level of field current of the field coil 204. This setting is performed in accordance with a field current limiting signal that is supplied to the field current limiting reference voltage circuit 110 from the engine ECU 5, transferred via the LAN terminal X1 and the vehicle-mounted LAN circuit 115.

Figure 4:
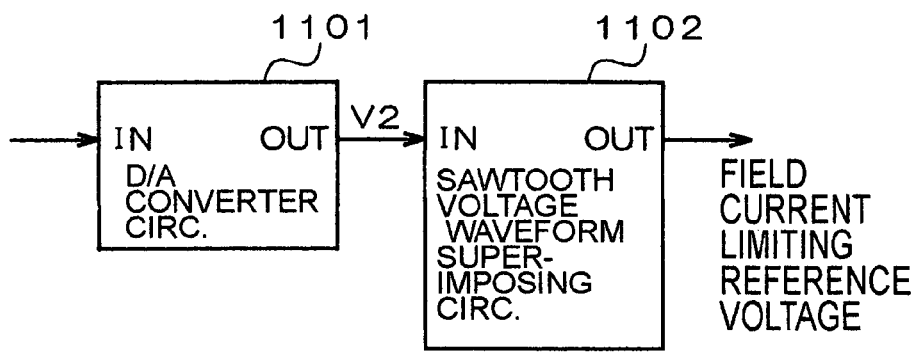
FIG. 4 shows details of a field current limiting reference voltage circuit.
Figure 5:
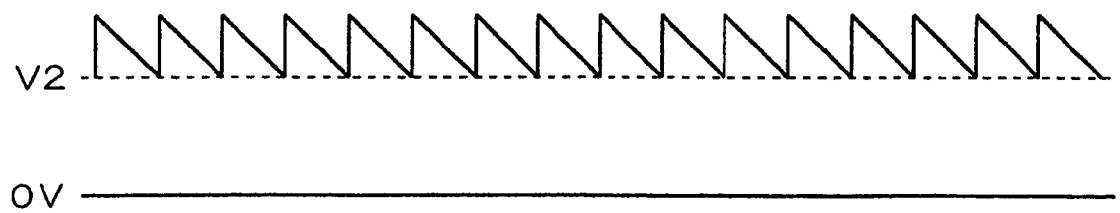
FIG. 5 is a waveform diagram for describing the operation of the field current limiting reference voltage circuit.

FIG. 4 shows the configuration of the field current limiting reference voltage circuit 110, and while FIG. 5 is a waveform diagram of the field current limiting reference voltage that is produced by the field current limiting reference voltage circuit 110. As shown, the field current limiting reference voltage circuit 110 is formed of a D/A converter 1101 and a sawtooth waveform voltage superimposing circuit 1102. The D/A converter 1101 converts the field current limiting signal that is supplied to the input terminal IN from the vehicle-mounted LAN circuit 115 (transferred from the engine ECU 5 via the LAN terminal X1), to a corresponding analog voltage signal V2 appearing at an output terminal OUT. This is supplied to the sawtooth waveform voltage superimposing circuit 1102, which generates the field current limiting reference voltage by superimposing a sawtooth waveform voltage on the voltage signal V2. The AND circuit 111 receives as inputs the field current limiting control signal that is produced from the voltage comparator 109, the output regulation control signal produced from the voltage comparator 107, and a control signal referred to as the F duty ratio limiting signal, that is supplied from the dedicated communication circuit 116. The AND circuit 111 outputs the AND product of these signals, as the F drive signal FR.

The field current detection circuit 112 detects the level of field current flowing in the field coil 204, based on the voltage appearing at a terminal of the resistor 103, and generates the field current detection voltage in accordance with the detected level of field current.

Figure 6:
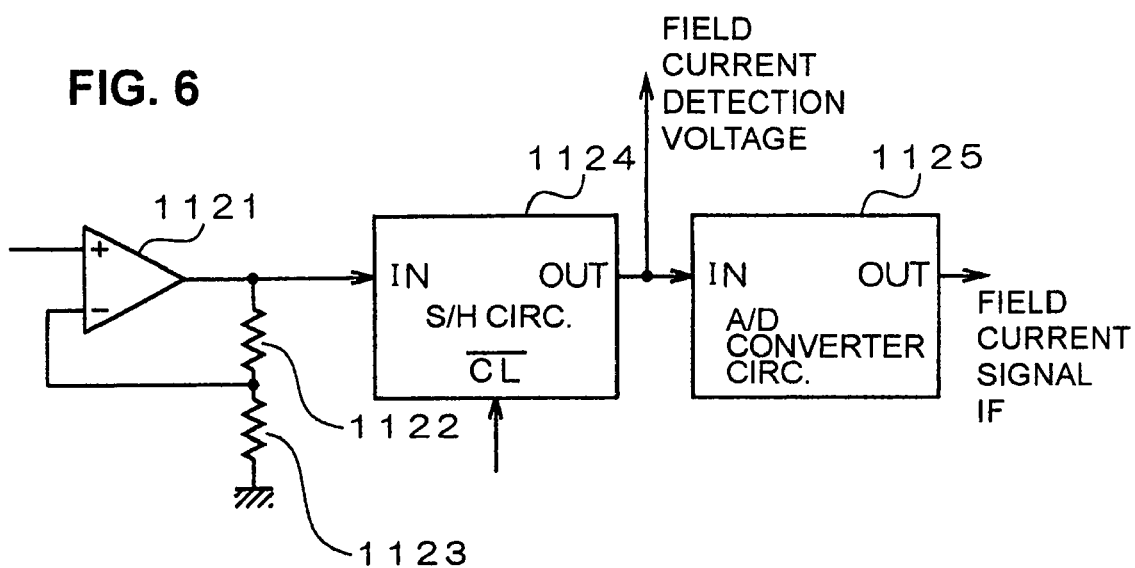
FIG. 6 shows details of a field current detection circuit in the above embodiment.

FIG. 6 shows details of the configuration of the field current detection circuit 112. As shown, this is made up of operational amplifier 1121, resistors 1122, 1123, a sample-and-hold circuit 1124 and a A/D converter 1125. The operational amplifier 1121 receives at its non-inverting input terminal the voltage appearing at one terminal of the sensing resistor 103, and receives at its inverting input terminal the voltage produced at the junction of the voltage divider circuit formed by resistors 1122, 1123, i.e., the voltage-divided output from the 1121 itself. As a result, the voltage appearing at the output terminal of the operational amplifier 1121 is equal to the voltage appearing at one terminal of the sensor resistor 103, multiplied by an amplification factor determined by the respective values of the resistors 1122, 1123. The sample-and-hold circuit 1124 acquires and holds the output voltage produced from the operational amplifier circuit 1121, at each of timings synchronized with rising edges of the clock signal CL. The 1125 converts the voltage held by the sample-and-hold circuit 1124 to a corresponding digital data value (these values constituting the field current signal IF) at each of periodic intervals. The field current signal IF that is thereby produced from the field current detection circuit 112 is inputted to the vehicle-mounted LAN circuit 115 and to the dedicated communication circuit 116.

In addition, the output voltage from the sample-and-hold circuit 1124 of the field current detection circuit 112 is supplied to the negative input terminal of the voltage comparator 109, as the field current detection voltage described hereinabove.

The voltage comparator 113 is used in detecting the electrical generation condition of the vehicle generator apparatus 2, by comparing one of the phase voltages of the stator coil 200 of the alternator with a reference voltage Vref, to produce an output signal (as a rotation signal VP) at the high level when the phase voltage becomes higher than Vref and at the low level when the phase voltage is lower than Vref. The electrical generation condition of the vehicle generator apparatus 2 is detected by the generated output detection circuit 114, based on the rotation signal VP produced from the voltage comparator 113, with a condition indication signal that is indicative of the generation condition being produced by the generated output detection circuit 114.

Figure 7:
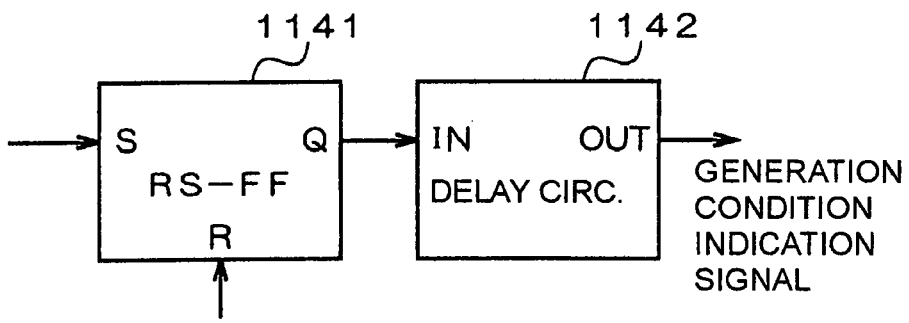
FIG. 7 shows details of a generated output detection circuit in the above embodiment.

FIG. 7 shows details of the generated output detection circuit 114 which, as shown, is made up of a RS-FF (R-S flip-flop) 1141 and a delay circuit 1142. The RS-FF 1141 temporarily registers the rotation signal VP that is produced from the voltage comparator 113. After a fixed time interval has elapsed, a periodically generated reset signal is inputted to the reset terminal R of the RS-FF 1141, and the registered contents are reset. The delay circuit 1142 outputs the signal value that is registered by the RS-FF 1141, after a delay interval. The output signal from the delay circuit 1142 is inputted to the dedicated communication circuit 116.

The vehicle-mounted LAN circuit 115, connected via the LAN terminal X1 to the vehicle-mounted LAN 300, performs control of communication between the engine ECU 5 and the vehicle generator control apparatus 1 via the vehicle-mounted LAN 300, which is connected to various external equipment including the engine ECU 5. In addition, when a selection signal is transmitted from the engine ECU 5 via the LAN terminal X1, designating a specific signal that is to be transmitted from the engine ECU 5 via the dedicated communication terminal X2 or that is to be received from the engine ECU 5 via the dedicated communication terminal X2, the vehicle-mounted LAN circuit 115 notifies the dedicated communication circuit 116 accordingly.

Figure 8:
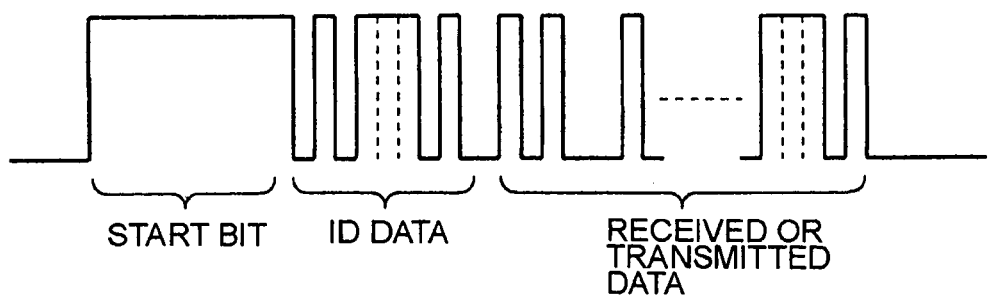
FIG. 8 shows the format in which data are transmitted and received via a LAN terminal, with the above embodiment.

FIG. 8 shows the format in which sets of data are transmitted and received via the LAN terminal X1. As shown in FIG. 8, each set of data is made up of a start bit, an ID data section, and a received (or transmitted) data section. The start bit is used in detecting the leading position of the received (or transmitted) data, while the ID data serves to specify the particular vehicle-mounted apparatus that is performing data communication, and includes a vehicle-mounted apparatus address (i.e., a transmission origin address) indicating the origin from which data have been transmitted (in the case of received data) or the destination address (in the case of transmitting data to a vehicle-mounted apparatus).

The received (or transmitted) data section consists of the actual data contents that are received or transmitted, and includes checksum data that are used in error detection. When it is detected that no errors have occurred in a set of received data (based on the checksum data) then the data are accepted by the receiving-end vehicle-mounted apparatus, while if an error is detected then the received data are destroyed by the receiving-end vehicle-mounted apparatus. The actual data contents will differ in accordance with different combinations of apparatuses that are transmitting and receiving data.

The dedicated communication circuit 116 is connected via the dedicated communication terminal X2 to the dedicated signal line 302, and executes control for effecting communication between the engine ECU 5 and the vehicle generator control apparatus 1 via the dedicated signal line 302. During normal operation (i.e., when the vehicle-mounted LAN circuit 115 is operating normally and the vehicle generator apparatus 2 is not in the "generation halted" status) the vehicle-mounted LAN circuit 115 sends a command to the dedicated communication circuit 116 indicating a specific signal that is to begin to be transmitted or received by the dedicated communication circuit 116 via the dedicated communication terminal X2, each time a selection signal is received by the vehicle-mounted LAN circuit 115 from the engine ECU 5 which newly designates such a specific signal.

In addition, the dedicated communication circuit 116 has a function of converting the duty ratio of a PWM signal that is received via the dedicated communication terminal X2 to a data signal, i.e., in a form which can be utilized by a corresponding circuit of the generator control apparatus in the same manner as data conveyed by the "received data contents" of a signal received by the vehicle-mounted LAN circuit 115 via the LAN terminal X1.

The output voltage (i.e., a detection voltage indicative of the output voltage level produced by the vehicle generator apparatus 2) from the voltage divider circuit formed by resistors 105, 106 is converted to digital data form, as an output voltage signal VB, by the A/D converter 117. This output voltage signal VB is inputted to the vehicle-mounted LAN circuit 115 and to the dedicated communication circuit 116.

With this embodiment, communication via the LAN terminal X1 by the vehicle-mounted LAN circuit 115 is executed in a master-slave form, in which the engine ECU 5 is the master apparatus and the vehicle generator control apparatus 1 containing the vehicle-mounted LAN circuit 115 is the slave apparatus. When a control signal (incorporating a selection signal) is sent from the engine ECU 5 via the LAN terminal X1, the vehicle-mounted LAN circuit 115 commands the dedicated communication circuit 116 to initiate communication via the dedicated communication terminal X2, whereby a signal that is specified by the selection signal from the engine ECU 5 is selected to be transmitted or received by the dedicated communication circuit 116 from/to the LAN circuit 115, via the dedicated communication terminal X2.

With a prior art type of master-slave communication arrangement, when the number of slave apparatuses becomes large, then in order to ensure that it will be possible to transmit signals from the slave apparatuses at appropriate timings, it has been necessary to increase the duration between the timings at which polling of a slave apparatus (such as the vehicle generator control apparatus 1) is performed. However this has the disadvantage that, with such communication, the speed of response is lowered. This is undesirable, when the communication involves processing of a signal such as a field coil drive signal, for which rapid response is essential. However with this embodiment, when a control signal is sent from the engine ECU 5 to the LAN terminal X1, communication via the dedicated communication terminal X2 is then initiated. As a result, since signals can be transmitted via the dedicated communication terminal X2 without delay, communication can be initiated instantly, and accurate real-time transfer of the selected signal to the engine ECU 5 (or reception of the selected signal from the engine ECU 5) can be performed.

The operation of the vehicle generator control apparatus 1 will be described more specifically in the following. FIG. 9 is a flow diagram of this operation. Initially, with the ignition switch (not shown in the drawings) of the vehicle carrying the vehicle generator control apparatus 1 being in the OFF position, so that no control signal is inputted through the LAN terminal X1 from the engine ECU 5, the vehicle generator control apparatus 1 (other than the vehicle-mounted LAN circuit 115) is held in the inoperative condition (step S100).

The vehicle-mounted LAN circuit 115 monitors the LAN terminal X1, to judge whether or not a control signal is being inputted from the engine ECU 5 (step S101). So long as no control signal is being inputted (i.e., NO decision) the vehicle generator control apparatus 1 is held in the inoperative state. When the vehicle ignition switch is set to the ON position, so that a control signal is inputted from the engine ECU 5 via the vehicle-mounted LAN 300 to the LAN terminal X1, the vehicle-mounted LAN circuit 115 detects this control signal, and so a YES decision is reached in step S101. Next, the vehicle-mounted LAN circuit 115 sends an activation signal to the power supply circuit 104, whereby the power supply circuit 104 begins to supply operating power to the various circuits of the vehicle generator control apparatus 1. As a result, the vehicle generator control apparatus 1 begins to execute a series of control operations, which are performed in accordance with the control signal transmitted from the engine ECU 5 (step S103).

Specific examples of these control operations are:
(1) An operation of controlling the output voltage of the vehicle generator apparatus 2 in accordance with a control signal transmitted from the engine ECU 5, received via the vehicle-mounted LAN circuit 115;
(2) A control operation for setting an upper limit value for the field current of the field coil 204, in accordance with a control signal transmitted from the engine ECU 5, received via the vehicle-mounted LAN circuit 115;
(3) Operations for transmitting various signals relating to the internal operating status of the vehicle generator control apparatus 1, transmitted to the engine ECU 5 via the vehicle-mounted LAN circuit 115.

These operations will be described in the following.

(1) Output Voltage Control Operation

With this operation, a control signal for regulating the level of output voltage from the vehicle generator apparatus 2 is transmitted from the engine ECU 5. The vehicle-mounted LAN circuit 115 responds by inputting to the voltage regulation reference voltage circuit 108 a voltage regulation signal, which has been received as data contents contained in the control signal from the engine ECU 5. The voltage regulation reference voltage circuit 108 thereby generates the output voltage regulation reference voltage, having a sawtooth waveform voltage superimposed on an analog voltage as described hereinabove, in accordance with the voltage regulation signal. This is supplied to the voltage comparator 107, which thereby produces the output regulation control signal at the high level if the detection voltage produced from the voltage divider circuit formed of the resistors 105, 106 is lower than the output voltage regulation reference voltage. That high level signal is transferred to the gate electrode of the MOS-FET 101 via the AND circuit 111, whereby the MOS-FET 101 is set in the ON (i.e., conducting) state, so that field current flows through the field coil 204, and the output voltage produced by the vehicle generator apparatus 2 rises accordingly. Conversely, the voltage comparator 107 produces the output regulation control signal at the low level if the detection voltage produced from the voltage divider circuit is higher than the output voltage regulation reference voltage. That low level signal, applied through the AND circuit 111 to the gate electrode of the MOS-FET 101, sets the MOS-FET 101 in the OFF state, so that the flow of current through the field coil 204 is interrupted, and the output voltage of the vehicle generator apparatus 2 accordingly falls.

In that way, the MOS-FET 101 performs ON/OFF switching control whereby the output voltage of the vehicle generator apparatus 2 is controlled to a value that is substantially identical to a regulated voltage value corresponding to the output voltage regulation reference voltage.

A control signal for setting an upper limit value of the field current (for example, 3 A) can be transmitted from the engine ECU 5, and when this occurs, the vehicle-mounted LAN circuit 115 inputs to the field current limiting reference voltage circuit 110 a field current limiting signal in accordance with data contents of the transmitted control signal. In response, the field current limiting reference voltage circuit 110 generates the field current limiting reference voltage with a sawtooth-waveform voltage superimposed on an analog voltage signal that corresponds to the aforementioned data contents. If the field current detection voltage that is applied from the field current detection circuit 112 to the voltage comparator 109 is lower than the field current limiting reference voltage, the voltage comparator 109 produces a high level output signal, that is applied via the AND circuit 111 to the gate electrode of the MOS-FET 101. The MOS-FET 101 is thereby set in the conducting condition, so that field current flows in the field coil 204, and the output voltage of the vehicle generator apparatus 2 accordingly rises. Conversely, if the field current detection voltage is lower than the field current limiting reference voltage, the voltage comparator 109 produces a low level output signal, that is applied via the AND circuit 111 to the gate electrode of the MOS-FET 101. The MOS-FET 101 is thereby set in the cut-off, i.e., non-conducting condition, so that field current flow through the field coil 204 is interrupted, and the output voltage of the vehicle generator apparatus 2 accordingly falls.

In that way the MOS-FET 101 performs ON/OFF switching control whereby the field current of the field coil 204 is held to a range of values that are lower than the field current limit value that is expressed by the data contents of the aforementioned control signal for setting an upper limit value of the field current (transmitted from the engine ECU 5).

(3) Operations for Transmitting Various Signals Relating to Internal Status

The F drive signal FR for controlling ON/OFF switching of the MOS-FET 101, the field current signal IF that is outputted from the field current detection circuit 112, the output voltage signal VB that is produced by the voltage comparator 107 by conversion of the output voltage from the voltage divider circuit formed by the resistors 105, 106, and the rotation signal VP that is outputted from the voltage comparator 113 based on the voltage that is generated by a phase winding of the stator coil 200, are respectively inputted to the vehicle-mounted LAN circuit 115. In the following, the above four signals will be collectively referred to as the "specific set of transmission signals". When the vehicle-mounted LAN circuit 115 receives a request transmitted from the engine ECU 5 for these signals to be transmitted via the LAN terminal X1, the vehicle-mounted LAN circuit 115 then transmits the requested signal(s) to the engine ECU 5 via the LAN terminal X1 and the vehicle LAN 300 by time-division multiplexing operation, as a serial stream of digital data.

In parallel with the control operation of step S103, receiving or transmitting of signals via the dedicated communication terminal X2 is performed, in response to requests from the engine ECU 5 (step S104). In this case, each such request is implemented as a selection signal that is transmitted from the engine ECU 5 via the LAN terminal X1, designating a specific signal that is to be transmitted from the vehicle generator control apparatus 1 to the engine ECU 5, or that is to be received by the vehicle generator control apparatus 1 from the engine ECU 5. The selection signal can designate one of the aforementioned "specific set of transmission signals", each of which is produced in the vehicle generator control apparatus 1. Alternatively, the selection signal can designate a signal that is produced in the engine ECU 5 and is to be received by the vehicle generator control apparatus 1, i.e., the field current limiting signal, F duty ratio limiting signal, or voltage regulation signal.

When a selection signal is received from the engine ECU 5 via the LAN terminal X1, the vehicle-mounted LAN circuit 115 notifies the dedicated communication circuit 116 accordingly. If the selection signal represents a request for transmission of a designated signal from the vehicle generator control apparatus 1, the dedicated communication circuit 116 converts the designated signal to PWM form, and transmits it to the engine ECU 5 via the dedicated communication terminal X2. If the selection signal constitutes a request for receiving a designated signal from the engine ECU 5 via the dedicated communication terminal X2, and the vehicle-mounted LAN circuit 115 sends notification of this, the dedicated communication circuit 116 performs processing to receive (in PWM signal form) the signal that is specified by the selection signal, from the dedicated communication terminal X2, and if necessary, convert the received PWM signal into suitable form for use within the vehicle generator control apparatus 1, before supplying it to the appropriate circuit.

FIG. 10 is a waveform diagram of signals that are transmitted via the dedicated communication terminal X2. For example, when a selection signal is received from the engine ECU 5 via the LAN terminal X1, designating the field current signal IF, the dedicated communication circuit 116 first completes preparation for transmitting the field current signal IF (time point t1), then begins to transmit the field current signal IF as a PWM signal via the dedicated communication terminal X2 to the engine ECU 5. In FIG. 10, it is assumed that a selection signal is then received from the engine ECU 5 via the LAN terminal X1, specifying the rotation signal VP. In that case, after the dedicated communication circuit 116 completes preparation for transmitting the rotation signal VP (time point t2), it halts transmission of the field current signal IF, and begins to transmit the rotation signal VP as a PWM signal via the dedicated communication terminal X2 to the engine ECU 5.

FIG. 11 is a waveform diagram of signals that are received via the dedicated communication terminal X2. In FIG. 11, it is assumed that firstly a selection signal has been received from the engine ECU 5 via the LAN terminal X1 that specifies the field current limiting signal. After preparation for receiving the field current limiting signal has been completed (time point t3), the dedicated communication circuit 116 begins to receive that signal in PWM form, from the dedicated communication terminal X2. As the signal is received, it is converted by the dedicated communication circuit 116 from PWM form into the same signal form as the field current limiting signal that is outputted from the vehicle-mounted LAN circuit 115 and supplied to the field current limiting reference voltage circuit 110 as described hereinabove. The resultant converted field current limiting signal produced by the dedicated communication circuit 116 is inputted to the field current limiting reference voltage circuit 110.

When the field current limiting reference voltage circuit 110 receives field current limiting signals both from the vehicle-mounted LAN circuit 115 and also from the dedicated communication circuit 116, it utilizes only the field current limiting signal that is supplied from the dedicated communication circuit 116.

Similar operation occurs when a selection signal designating the voltage regulation signal is received from the engine ECU 5 via the LAN terminal X1, resulting in the voltage regulation reference voltage circuit 108 receiving voltage regulation signals both from the vehicle-mounted LAN circuit 115 and also from the dedicated communication circuit 116. In that case, the voltage regulation reference voltage circuit 108 selects the voltage regulation signal that is supplied from the dedicated communication circuit 116, for use in producing the output voltage regulation reference voltage.

When a selection signal is received by the vehicle-mounted LAN circuit 115 from the engine ECU 5 via the LAN terminal X1 that specifies the F duty ratio limiting signal, then after preparation for receiving the F duty ratio limiting signal has been completed (time point t4), the dedicated communication circuit 116 begins to receive that signal in PWM form, from the dedicated communication terminal X2. As the F duty ratio limiting signal is received, it is inputted (still in PWM form) from the dedicated communication circuit 116 to the AND circuit 111. Assuming for example that the F duty ratio limiting signal expresses a duty ratio of 90%, then the duty ratio of the F drive signal FR that is outputted from the AND circuit 111 becomes limited to a maximum value of 90%.

In parallel with the control operations of step S103 and the signal transmitting and receiving operations of step S104 described above, the vehicle-mounted LAN circuit 115 performs judgement operations at periodic intervals (for example, once every 2 seconds) to determine whether or not communication via the LAN terminal X1 continues to be possible (step S105). If it is found that a condition whereby communication via the LAN terminal X1 is not possible has continued for more than 2 seconds, this will generally signify that the LAN terminal X1 is in the open-circuit condition, due to an open-circuit failure within the vehicle-mounted LAN 300 or due to an open-circuit having occurred in some part of the system other than the vehicle-mounted LAN 300. If it is judged in step S105 that this condition has not occurred (a NO decision) then the operation of step 103 is continued, with normal control being applied. However if it is judged in step 105 that the condition whereby communication via the LAN terminal X1 is not possible has continued for more than 2 seconds (i.e., YES decision), then the vehicle-mounted LAN circuit 115 transmits a signal constituting a notification of abnormality occurrence, to the voltage regulation reference voltage circuit 108 and to the field current limiting reference voltage circuit 110. The voltage regulation reference voltage circuit 108 and field current limiting reference voltage circuit 110 are each configured to respond to that notification by executing control using predetermined default values (step S106).

In addition, in that case, a signal to notify that normal communication via the LAN terminal X1 has been interrupted is also supplied by the LAN circuit 115 to the dedicated communication circuit 116. In response, the dedicated communication circuit 116 selects the F drive signal FR from the aforementioned specific set of transmission signals, to be converted to PWM signal form and transmitted via the dedicated communication terminal X2 to the engine ECU 5 (step S107). That is to say, with this embodiment when there is such an abnormality occurrence, priority is assigned to transmitting the F drive signal FR to the engine ECU 5 from the vehicle generator control apparatus 1 via the dedicated communication terminal X2. However depending upon the contents of control operations executed by the engine ECU 5, it would be possible to assign such priority in some other appropriate way.

For example, with this embodiment, the engine ECU 5 obtains information indicative of transitional increases and decreases in the level of torque that must be applied to the vehicle generator apparatus 2 by the vehicle engine, based on the F drive signal FR that is transmitted via the LAN terminal X1 or the dedicated communication terminal X2, and the engine ECU 5 controls the idling speed of the vehicle engine in accordance with these varying requirements for torque. Hence with this embodiment, if transmitting/receiving via the LAN terminal X1 becomes impossible, priority is given to transmitting the F drive signal FR to the engine ECU 5 via the dedicated communication terminal X2. The engine ECU 5 can thereby continue to control the idling speed.

In step S108, the dedicated communication circuit 116 judges whether or not the vehicle generator apparatus 2 has entered a power generation halt status (i.e., as indicated by the condition indication signal that is produced from the generated output detection circuit 114). If it is judged that power generation is continuing (i.e., NO decision) then operation returns to step S107, with transmission of the F drive signal FR to the engine ECU 5 being continued. If it is found in step S108 that the vehicle generator apparatus 2 is in a generation halt status (i.e., YES decision) then the dedicated communication circuit 116 transmits a generation halt warning signal to the engine ECU 5, via the dedicated communication terminal X2 (step S109). The generation halt warning signal is transmitted as a PWM signal, having a PWM modulation period which is different from that of the normal F drive signal FR when it is transmitted as a PWM signal. For example if the PWM modulation period of the normal F drive signal FR is 5 ms, the PWM modulation period of the generation halt warning signal might be made half of that, i.e., 2.5 ms. The engine ECU 5 is configured to detect that the generation halt status of the vehicle generator apparatus 2 has occurred, by detecting this different modulation period of the received PWM signal, and responds to this detection by generating some form of warning indication directed to the vehicle driver.

With this embodiment, the generation halt warning signal is transmitted by continuing to transmit the F drive signal FR as a PWM signal, but with the above-described change in the modulation period. In that way, the engine ECU 5 continues to receive the F drive signal FR while at the same time being notified of the generation halt condition.

FIG. 12 is a waveform diagram of signals that are transmitted via the dedicated communication terminal X2 when an abnormal status of the LAN terminal X1 occurs, or when the vehicle generator apparatus 2 enters a generation halt status. In FIG. 12, it is assumed that communication occurs normally until time point t5, with the signal that is currently selected (specified by data transmitted from the engine ECU 5, as described hereinabove) being transmitted from or received by the vehicle generator control apparatus 1 via the LAN terminal X1. At time point t5, an open-circuit failure of the LAN terminal X1 occurs, so that the dedicated communication circuit 116 selects the F drive signal FR as having the highest priority (as described hereinabove) and transmits that signal in PWM form, via the dedicated communication terminal X2, to the engine ECU 5. In FIG. 12 it is assumed that a generation halt status of the vehicle generator apparatus 2 subsequently occurs at time point t6, and so the dedicated communication circuit 116 then transmits a generation halt warning signal via the dedicated communication terminal X2 to the engine ECU 5 as described above, i.e., as a PWM signal having a modulation period that is half of that of a normal transmitted PWM signal.

Thus with this embodiment, various different signals can be transmitted and received by TDM operation, as a sequential data stream, between the vehicle generator control apparatus 1 and the engine ECU 5, via the LAN terminal X1. Moreover in addition, it is further possible to perform communication via the dedicated communication terminal X2, so that communication of a specific signal, which has been specified by a selection signal that is transmitted to the vehicle generator control apparatus 1 from the engine ECU 5 via the LAN terminal X1, can be performed with a high speed of response and high resistance to the effects of electrical noise. Moreover since various different types of signals can be handled, substantial reductions in cost can be achieved, by comparison with a system which utilizes only dedicated communication terminals, i.e., in which a plurality of dedicated communication terminals such as the dedicated communication terminal X2 must be provided in order to enable concurrent communication of a plurality of signals.

Furthermore, when the selection signal from the engine ECU 5 designates the field coil drive signal, which controls the level of field current, the dedicated communication circuit 116 transmits a PWM signal representing the waveform of the field coil drive signal (i.e., the F drive signal FR) to the external control apparatus constituted by engine ECU 5, via the dedicated communication terminal X2. The engine ECU 5 can thereby at any time (i.e., as a part of normal operation, or when specially required) request and obtain a signal expressing the waveform of the field coil drive signal, transmitted directly via the dedicated communication terminal X2, and so can determine the operating condition of the vehicle generator apparatus 2 and thereby can readily control the idling speed of the vehicle engine accordingly, in a stable manner.

Furthermore when the selection signal from the engine ECU 5 specifies the rotation signal that expresses the phase voltage of one of the phase windings of the stator coil 200 of the vehicle generator apparatus 2, the dedicated communication circuit 116 transmits a PWM signal representing the waveform of the rotation signal to the external control apparatus constituted by engine ECU 5, via the dedicated communication terminal X2. The engine ECU 5 can thereby at any time (as a part of normal operation, or when specially required) request and obtain a signal expressing the rotation signal, as a signal indicative of the speed of rotation of the rotor of the alternator of the vehicle generator apparatus 2, with that signal being acquired through real-time operation. The engine ECU 5 can thereby compare the actual speed of rotation of the rotor of the alternator with the engine speed of rotation, and can thereby detect any slippage of the drive belt of the alternator, or can detect the actual pulley ratio with which the alternator is being driven from the engine.

It should be noted that the term "real time operation" as used herein, relating to signal communication, signifies transferring a signal directly over a communication path, without the communication being delayed by the effects of time-division multiplexing of signals or of signal transfer through a digital data communication network.

Moreover when the selection signal from the engine ECU 5 specifies the output voltage signal, expressing the level of output voltage from the vehicle generator apparatus 2 (i.e., appearing at the aforementioned B terminal of the vehicle generator apparatus 2) the dedicated communication circuit 116 transmits a PWM signal representing the waveform of that output voltage signal to the external control apparatus constituted by engine ECU 5, via the dedicated communication terminal X2. The engine ECU 5 can thereby at any time (as a part of normal operation, or when specially required) request and obtain a signal expressing the output voltage that is being produced at that point in time by the vehicle generator apparatus 2, with that signal being transferred directly via the dedicated communication terminal X2. The engine ECU 5 can thereby perform processing of that signal to smooth out variations in the represented output voltage, to thereby obtain the average value of output voltage that is being generated by the vehicle generator apparatus 2. The engine ECU 5 can thereby accurately detect when that voltage attains an abnormal value.

Similarly, when the selection signal from the engine ECU 5 specifies the field current signal, representing the level of field current of the field coil 204, the dedicated communication circuit 116 transmits a PWM signal representing the waveform of that field current signal to the external control apparatus constituted by engine ECU 5, via the dedicated communication terminal X2. The engine ECU 5 can thereby at any time (as a part of normal operation, or when specially required) request and obtain a signal expressing the level of field current which is being passed through the field coil 204 at that point in time, with that signal being transferred directly via the dedicated communication terminal X2. As a result, even if fluctuations in the level of the field current are occurring at that time (e.g., due to instability of controlling the output voltage of the vehicle generator apparatus 2, or instability of controlling the field current) the engine ECU 5 can smooth out these fluctuations to accurately obtain the average value of the field current at that point in time. The engine ECU 5 can thereby utilize that average value of field current to determine the level of torque that is required to drive the alternator of the vehicle generator apparatus 2 at that time, and can control the operation of the vehicle engine accordingly.

Similarly, when the selection signal from the engine ECU 5 specifies (as a signal that is to be received from the engine ECU 5) the duty ratio limiting signal (Fduty limiting signal), representing the upper limit value of duty ratio that is to be applied in ON/OFF switching control of the field current, the dedicated communication circuit 116 receives the duty ratio limiting signal from the dedicated communication terminal X2 as a PWM signal, and supplies it directly to the AND circuit 111 to effect limitation of the duty ratio of ON/OFF switching control of the field current of the alternator. Moreover, when the selection signal specifies the field current limiting signal, representing the upper limit value of field current of the field coil 204, the dedicated communication circuit 116 receives that field current limiting signal as a PWM signal, transmitted from the engine ECU 5 via the dedicated communication terminal X2. The dedicated communication circuit 116 then converts that signal into suitable form for being utilized by the field current limiting reference voltage circuit 110 as described hereinabove.

The vehicle generator control apparatus 1 can thereby at any time (as a part of normal operation, or when specially required) be supplied with signals, from the engine ECU 5, expressing the upper limit value for the switching duty ratio that determines the level of field current, and the upper limit value of the field current itself. The engine ECU 5 can thus accurately control the operation of the vehicle generator apparatus 2 in accordance with the level of torque that must be applied by the engine to drive the vehicle generator apparatus 2, with excellent control response characteristics.

Similarly, when the selection signal from the engine ECU 5 specifies (as a signal that is to be received from the engine ECU 5) the voltage regulation signal that expresses the value to which the output voltage of the vehicle generator apparatus 2 is to be regulated, the dedicated communication circuit 116 receives (via the dedicated communication terminal X2) a PWM signal representing the waveform of the voltage regulation signal. The dedicated communication circuit 116 converts that signal into suitable form for being supplied to the voltage regulation reference voltage circuit 108, which thereby produces the output voltage regulation reference voltage as described hereinabove. This further enables the engine ECU 5 to effectively control the electrical generating condition of the vehicle generator apparatus 2.

In addition, if communication via the LAN terminal X1 becomes impossible, the dedicated communication circuit 116 assigns a predetermined one of a set of signals that can be transmitted to the engine ECU 5, as having the highest priority, and transmits that highest-priority signal via the dedicated communication terminal X2 as a PWM signal to the engine ECU 5. In that way, even if communication cannot be performed via the LAN terminal X1 and the vehicle-mounted LAN 300, the engine ECU 5 can continue to perform at least the most essential form of control of the vehicle generator apparatus 2.

In particular, if the aforementioned highest-priority signal is predetermined as being the field coil drive signal (which is applied to the gate electrode of the MOS-FET 101, as described above), the engine ECU 5 can continue to receive that field coil drive signal even if communication via the LAN terminal X1 is interrupted, and so can reliably detect transient increases and decreases in the level of torque required to drive the vehicle generator apparatus 2, and can thereby perform operations such as controlling the idling speed of the vehicle engine accordingly.

In addition, if an abnormal generation condition of the vehicle generator apparatus 2 occurs, the dedicated communication circuit 116 transmits a signal warning of this abnormal generation condition to the engine ECU 5 via the dedicated communication terminal X2. This warning signal is transmitted irrespective of the communication status of the LAN terminal X1 at that time. The engine ECU 5 is thereby immediately notified of occurrence of such an abnormal generation condition, and can perform necessary operations in response. The reliability of the vehicle battery charging system that includes the vehicle generator apparatus 2 is thereby substantially enhanced.

Furthermore when such an abnormal generation condition of the vehicle generator apparatus 2 results in a cessation of power generation by the vehicle generator apparatus 2, the engine ECU 5 can be immediately notified at the commencement of such an abnormal generation condition by the aforementioned warning signal transmitted via the dedicated communication terminal X2, so that the engine ECU 5 can take immediate measures against a sudden cessation of supply of electric power to various equipment of the vehicle. This is especially important when such a power failure of the vehicle generator apparatus 2 occurs while the vehicle is running.

The abnormal generation condition warning signal can advantageously be implemented by the dedicated communication circuit 116 transmitting a PWM signal via the dedicated communication terminal X2 using a value of PWM modulation period which is different from that of a normal PWM signal that is transmitted via the dedicated communication terminal X2. It should be noted that with such a method, the engine ECU 5 can distinguish between an abnormal power generation condition of the vehicle generator apparatus 2 and an open-circuit or short-circuit failure condition of the connection via the dedicated communication terminal X2, since such an open-circuit or short-circuit failure condition will result in a signal that is fixed at the H or the L level being supplied to the engine ECU 5 from the dedicated communication terminal X2, rather than a PWM signal.

Furthermore when communication via the LAN terminal X1 becomes impossible, the dedicated communication circuit 116 can transmit to the engine ECU 5, via the dedicated communication terminal X2, a message notifying whether the vehicle generator apparatus 2 is operating in a normal or abnormal condition. In that way, communication with the engine ECU 5 can be continued via the dedicated communication terminal X2 when communication via the LAN terminal X1 is interrupted, so that the engine ECU 5 can be notified of any abnormal operating condition of the vehicle generator apparatus 2, and can for example generate a warning indication to the vehicle driver when such an abnormal condition occurs.

In particular, when communication via the LAN terminal X1 becomes impossible, and also an abnormal operating condition of the vehicle generator apparatus 2 occurs, the dedicated communication circuit 116 transmits a signal such as the field coil drive signal, in PWM form, via the dedicated communication terminal X2 to the engine ECU 5, with that PWM signal having a modulation period that is different from the modulation period that is normally used. In that way, although communication through the LAN terminal X1 and vehicle-mounted LAN 300 has become interrupted, the engine ECU 5 continues to obtain the field coil drive signal that is being applied to the vehicle generator apparatus 2 and so can ascertain the level of torque that is required to drive the alternator of the vehicle generator apparatus 2 and perform control of the vehicle engine accordingly, with effective control response to variations in torque. At the same time, the engine ECU 5 is being notified of the abnormal operating condition of the vehicle generator apparatus 2, as indicated by the different modulation period of the PWM signal received from the vehicle generator control apparatus 1 via the dedicated communication terminal X2, and so for example can perform appropriate operations such as generating a warning indication that is directed to the vehicle driver. The overall reliability of the battery charging system of the vehicle is thereby enhanced.

It should be noted that the invention is not limited to the embodiment described above, and that various modifications and alternative configurations could be envisaged which fall within the scope of the invention, as set out in the appended claims. For example with the above embodiment, if communication via the LAN terminal X1 and the vehicle-mounted LAN 300 has become interrupted and the vehicle generator apparatus 2 then enters a condition whereby electrical generation is halted, notification of this is transmitted to the engine ECU 5 by sending (via the dedicated communication terminal X2) a PWM signal such as the field coil drive signal having a modulation period that is different from a standard modulation period used for such PWM signals. However it would be equally possible for a specific warning signal to be transmitted in PWM form, using the standard PWM modulation period. Alternatively, it would be possible for example for the dedicated communication circuit 116 to fixedly apply a high level voltage to the dedicated communication terminal X2 when a power generation failure condition of the vehicle generator apparatus 2 occurs, to thereby transmit a high-level signal to the engine ECU 5, with the engine ECU 5 being configured to recognize this as indicating that the vehicle generator apparatus 2 has ceased to generate electric power, or for the dedicated communication circuit 116 to fixedly apply a low-level voltage to the dedicated communication terminal X2, as such a predetermined warning indication signal.

Furthermore it is not essential that signals indicative of abnormal operation of the vehicle generator apparatus 2 are transmitted via the dedicated communication terminal X2 only under a condition in which communication via the LAN terminal X1 is interrupted. That is to say, it would be possible to configure the system such that the vehicle-mounted LAN circuit 115 always transmits any warning signal indicative of abnormal operation of the vehicle generator apparatus 2 directly to the engine ECU 5, via the dedicated communication terminal X2.

It would moreover also be possible to configure the system such that respective specific warning signals are transmitted from the vehicle generator control apparatus 1 to the engine ECU 5 when particular failure conditions relating to the vehicle generator apparatus 2 occur, such as when there is a loss of control of the level of output voltage produced by the vehicle generator apparatus 2.

What is claimed is:

1. A generator control apparatus for controlling an electric power generating condition of a vehicle-use electric generator apparatus by repetitive on/off switching control of a field current of a field coil of an alternator of said electrical generator apparatus and for communicating with an external control apparatus for exchange of respective ones of a plurality of specific signals, said specific signals including signals relating to a status of said control of said electric power generating condition and signals relating to control commands, said generator control apparatus comprising:
   a LAN (Local Area Network) terminal connected for communication with said external control apparatus through a LAN, and a LAN circuit connected to said LAN terminal for transmitting and receiving said specific signals via said LAN terminal; and
   a dedicated communication terminal connected for communication with said external control apparatus through a dedicated signal line, and a dedicated communication circuit connected to said dedicated communication terminal and to said LAN circuit, for transmitting or receiving via said dedicated communication terminal a one of said specific signals that is designated by a selection signal transmitted from said external control apparatus via said LAN terminal to said LAN circuit.

2. A generator control apparatus according to claim 1, said generator control apparatus comprising means for producing a field coil drive signal for effecting said switching control, wherein said dedicated communication circuit comprises means responsive to designation of said field coil drive signal by said selection signal for producing a PWM (pulse width modulation) signal expressing a waveform of said field coil drive signal and transmitting said PWM signal via said dedicated communication terminal to said external control apparatus.

3. A generator control apparatus according to claim 1, said alternator comprising a plurality of phase windings and said generator control apparatus comprising means for producing a rotation signal representing a phase voltage generated by one of said phase windings, wherein said dedicated communication circuit comprises means responsive to designation of said rotation signal by said selection signal for producing a PWM (pulse width modulation) signal expressing a waveform of said rotation signal and transmitting said PWM signal via said dedicated communication terminal to said external control apparatus.

4. A generator control apparatus according to claim 1, wherein said electrical generator apparatus rectifies an AC voltage generated by said alternator to derive an output voltage, said generator control apparatus comprising means for producing an output voltage signal expressing a value of said output voltage, wherein said dedicated communication circuit comprises means responsive to designation of said output voltage signal by said selection signal for producing a PWM (pulse width modulation) signal expressing a waveform of said output voltage signal and transmitting said PWM signal via said dedicated communication terminal to said external control apparatus.

5. A generator control apparatus according to claim 1, said generator control apparatus comprising means for producing a field current signal expressing a value of a field current of said field coil, wherein said dedicated communication circuit comprises means responsive to designation of said field current signal by said selection signal for producing a PWM (pulse width modulation) signal expressing a waveform of said field current signal and transmitting said PWM signal via said dedicated communication terminal to said external control apparatus.

6. A generator control apparatus according to claim 1, said selection signal designating a duty ratio limiting signal that expresses an upper limit value of a duty ratio of said repetitive on/off switching control, wherein said dedicated communication circuit comprises means responsive to said selection signal for receiving said duty ratio limiting signal as a PWM signal, via said dedicated communication terminal from said external control apparatus.

7. A generator control apparatus according to claim 1, said selection signal designating a field current limiting signal that expresses an upper limit value of a field current of an alternator of said electrical generator apparatus, wherein said dedicated communication circuit comprises means responsive to said selection signal for receiving said field current limiting signal as a PWM signal, via said dedicated communication terminal from said external control apparatus.

8. A generator control apparatus according to claim 1, said selection signal designating a voltage regulation signal that expresses a value to which an output voltage of said electrical generator apparatus is to be regulated, wherein said dedicated communication circuit comprises means responsive to said selection signal for receiving said voltage regulation signal as a PWM signal, via said dedicated communication terminal from said external control apparatus.

9. A generator control apparatus according to claim 1, wherein one of said plurality of specific signals is predetermined as being a maximum priority signal, and wherein said dedicated communication circuit comprises means responsive to a condition whereby communication via said LAN terminal is interrupted, for producing a PWM (pulse width modulation) signal expressing a waveform of said maximum priority signal and transmitting said PWM signal via said dedicated communication terminal to said external control apparatus.

10. A generator control apparatus according to claim 2, wherein said field coil drive signal is predetermined as being a maximum priority signal, and wherein said dedicated communication circuit comprises means responsive to a condition whereby communication via said LAN terminal is interrupted, for producing a PWM (pulse width modulation) signal expressing a waveform of said field coil drive signal and transmitting said PWM signal via said dedicated communication terminal to said external control apparatus.

11. A generator control apparatus according to claim 1, wherein said dedicated communication circuit comprises means responsive to occurrence of an abnormal generation status of said electrical generator apparatus for transmitting a warning signal indicative of said occurrence via said dedicated communication terminal to said external control apparatus.

12. A generator control apparatus according to claim 11, wherein said abnormal generation status is a condition of cessation of electric power generation by said electrical generator apparatus.

13. A generator control apparatus according to claim 11, wherein said warning signal is a PWM (pulse width modulation) signal having a modulation period that is different from a common modulation period of all other PWM signals transmitted via said dedicated communication terminal.

14. A generator control apparatus according to claim 1, wherein said dedicated communication circuit comprises means responsive to occurrence of an interruption of communication via said LAN terminal for transmitting a signal indicative of a status of electrical generation by said electrical generator apparatus, via said dedicated communication terminal to said external control apparatus.

15. A generator control apparatus according to claim 2, wherein said dedicated communication circuit comprises means responsive to a condition whereby said electrical generator apparatus is operating normally and communication via said LAN terminal is interrupted, for producing a first PWM (pulse width modulation) signal expressing said waveform of said field coil drive signal, and transmitting said first PWM signal via said dedicated communication terminal to said external control apparatus, and responsive to a condition whereby said electrical generator apparatus is in an abnormal electrical generation status and communication via said LAN terminal is interrupted, for producing a second PWM signal having a different modulation period from said first PWM signal, and transmitting said second PWM signal via said dedicated communication terminal to said external control apparatus.

16. A generator control apparatus according to claim 1, wherein said communication between said LAN circuit and said external control apparatus is performed by a master/slave communication method in which said external control apparatus functions as a master apparatus and said LAN circuit functions as a slave apparatus.

* * * * *